United States Patent [19]

Isozumi

[11] Patent Number: 5,113,084
[45] Date of Patent: May 12, 1992

[54] PLANETARY GEAR FOR STARTER MOTOR

[75] Inventor: Shuzou Isozumi, Hyogo, Japan

[73] Assignee: Mitsubishi Denki K.K., Tokyo, Japan

[21] Appl. No.: 718,516

[22] Filed: Jun. 21, 1991

[30] Foreign Application Priority Data

Jul. 10, 1990 [JP] Japan ................ 2-183276

[51] Int. Cl.⁵ .............................. F02N 15/06
[52] U.S. Cl. ..................... 290/48; 74/7 R; 290/38 R
[58] Field of Search ............. 290/38 R, 48

[56] References Cited

U.S. PATENT DOCUMENTS

| | | | |
|---|---|---|---|
| 54,825,095 | 4/1989 | Morishita et al. | 290/48 |
| 4,868,442 | 9/1989 | Isozumi et al. | 290/48 |
| 4,924,108 | 5/1990 | Isozumi | 290/48 |

FOREIGN PATENT DOCUMENTS

| | | | |
|---|---|---|---|
| 184964 | 9/1985 | Japan | 290/48 |
| 209665 | 10/1985 | Japan | 290/48 |
| 23865 | 2/1986 | Japan | 290/48 |
| 1103008 | 7/1984 | U.S.S.R. | 290/48 |
| 8800293 | 1/1988 | World Int. Prop. O. | 290/48 |

Primary Examiner—A. D. Pellinen
Assistant Examiner—Robert L. Hoover
Attorney, Agent, or Firm—Sughrue, Mion, Zinn Macpeak & Seas

[57] ABSTRACT

In a planet gear speed-reducing starter in which the rotation of the armature rotary shaft is applied through a planet gear speed-reducing mechanism to the output rotary shaft coupled to the planet gear speed-reducing mechanism, a carrier supporting the planetary gears of the planet gear speed-reducing mechanism is fitted on the rear end portion of the output rotary shaft with its rearward movement limited in such a manner that the output rotary shaft is limited in rearward movement while the carrier is limited in forward movement, and the carrier and the output rotary shaft are slidable with a predetermined torque with each other, whereby the impact occurring therewith is absorbed sufficiently.

8 Claims, 4 Drawing Sheets

PLANETARY GEAR FOR STARTER MOTOR

BACKGROUND OF THE INVENTION

This invention relates to planet gear speed-reducing starter, and more particularly to an improvement of the mechanism in a planet gear speed-reducing starter which is adapted to receive the impact stress which occurs with the power transmission mechanism thereof.

A conventional planet gear speed-reducing starter of this type is as shown in FIG. 6 (cf. Japanese Utility Model (OPI) Application No. 74050/1988 (the term "OPI" as used herein means an "unexamined published application"). In FIG. 6, reference numeral 1 designates the armature of a DC motor; 2, the rotary shaft of the armature 1; 3, a commutator mounted on the rear end portion of the rotary shaft 2; 4, brushes and their holders which are secured to the rear bracket 6 of the motor with bolts 5; 7, a bearing inserted in a recessed formed in the rear bracket 6, thus supporting the rear end of the armature rotary shaft 2; 8, the yoke of the DC motor; and 8a, permanent magnets fixedly mounted on the inner cylindrical surface of the yoke 8, the permanent magnets 8a forming magnetic fields. One end of the cylindrical yoke 8 is connected to the rear bracket 6, and the other end is fixedly secured to the front bracket 10 in which an internal gear 9 forming a planet gear speed-reducing unit is fitted. The yoke 8 and the front bracket 10 are separated with a center plate 11 from each other. A spur gear 12 is formed on the front end portion of the armature rotary shaft 2, and is engaged with planetary gears 13, which are supported through bearings 14 by support pins 15. The support pins 15 are fixedly embedded in a flange 16 which forms the arm of the planet gear speed-reducing unit, and which is secured to an output rotary shaft 17. The output rotary shaft 17 is supported by a sleeve bearing 18 fitted in the inner cylindrical surface of a protrusion extended from the internal gear 9. A sleeve bearing 19 is fitted in a recess formed in the rear end of the output rotary shaft 17, thus supporting the front end portion of the armature rotary shaft 2. A steel ball 20 is provided between the front end face of the armature rotary shaft 2 and the output rotary shaft 17 so as to transmit the thrust load. A helical spline gear 21 is formed on the output rotary shaft 17, and an overrunning clutch 22 is engaged with the helical spline gear 21 in such a manner that it is slidable back and forth. A pinion 24 is coupled to the overrunning clutch 22. The amount of axial movement of the pinion 22 is regulated by a stopper 23. The output rotary shaft 17 is further supported through a sleeve bearing 25 by the front end portion of the front bracket 10. More specifically, the sleeve bearing 25 is fitted in the cylindrical wall of a hole formed in the front end portion of the front bracket 10, and is mounted on the front end portion of the output rotary shaft so as to support the latter. A lever 26 of resin is swingably mounted on the front bracket with its one end coupled to the plunger 28 of an electromagnetic switch 27 and with the other end portion coupled to the rear end portion of the overrunning clutch 22. The electromagnetic switch 27 is connected to the brush 4 through a lead wire 29 one terminal of which is connected to the cap 31 with a nut 30. The center plate 11 has through-holes 32 to lead the heat generated inside the armature toward the front bracket, thereby to prevent the rise of temperature inside the yoke 8.

When the key switch (not shown) is turned on, the electromagnetic switch 27 is energized, so that voltage is applied to the brush 4 through the lead wire 29, and therefore the armature 1 produces torque. The rotation of the armature is transmitted through the planet gear speed-reducing unit to the overrunning clutch 22. On the other hand, upon energization of the electromagnetic switch 27, the plunger 28 is moved to the left in FIG. 6. The movement of the plunger 28 is transmitted through the lever 26 to the overrunning clutch 22. As a result, the overrunning clutch 22 is moved forwardly (to the right in FIG. 6), and the pinion 24 is engaged with the ring gear (not shown) of the engine (not shown).

On the other hand, FIG. 7 shows one example of a conventional planet gear speed-reducing starter having a mechanism adapted to lessen the impact load which may occur with its speed reducer is as shown in FIG. 7 (cf. Japanese Utility Patent (OPI) Application No. 45081/1987). As shown in FIG. 7, a ring gear 29 has a helical spline gear 30 on its outer periphery, and an internal gear 31 on its inner periphery which is engaged with planetary gears 13. A front bracket 10 has a helical spring gear 33 which is formed in the inner wall of its stepped portion 10a so as to engage with the above-described helical spline gear 30 of the ring gear 29. An auxiliary plate 34 is fitted in the stepped portion 10a. The output rotary shaft 17 is supported through a sleeve bearing 18 fitted in the cylindrical hole of the auxiliary plate 34. An elastic ring 35 of rubber is interposed between the ring gear 29 and the auxiliary plate 34. The elastic ring 35 is adapted to elastically receive the force of the ring gear 29 which is threadably moved on the helical spring gear 33 axially forwardly (to the right in FIG. 7) by the reaction of pressure attributing to the inscribed engaging motion of the planetary gears 13. The other arrangements are the same as those in the conventional starter described with reference to FIG. 6.

In the starter shown in FIG. 7, the reaction of pressure attributing to the rotation of the planetary gears 13 is elastically received by the elastic ring 35 as the ring gear 29 is threadably moved, so that the force of impact occurring with the power system of the starter is smoothly received.

In the conventional starter shown in FIG. 6 (Japanese Utility Patent (OPI) No. 74050/1988) the load torque is absorbed only by the rigidity in deflection of the shafts (or the rotary shaft 2, and the output rotary shaft 17) and the brackets (such as the front bracket 10) and by the twist of the overrunning clutch 22. If torque occurs which is larger in energy than the absorption, then the torque cannot be absorbed, thus damaging the engine ring gear and some components of the starter. Such large torque occurs when the starter is operated again as in the case of an engine stall; that is, it occurs during the inertial rotation of the engine or starter, so that the two items large in the energy of rotation collide with each other, thus causing a great impact.

On the other hand, in the conventional starter shown in FIG. 7 (Japanese Utility Patent (OPI) No. 45081/1987, the elastic ring 35 is provided to elastically receive the force of the ring gear 29 which is threadably moved, thereby to absorb the impact. However, the starter suffers from the difficulties that it is unavoidably bulky and intricate in construction because of the possible capacity and fluctuation in characteristic of the elastic member 35, and it is rather unstable in impact absorbing operation.

SUMMARY OF THE INVENTION

Accordingly, an object of this invention is to eliminate the above-described difficulties accompanying a conventional planet gear speed-reducing starter.

More specifically, an object of the invention is to provide a planet gear speed-reducing starter which is simple in construction and which has an impact absorbing mechanism which operates stably.

The foregoing object and other objects of the invention have been achieved by the provision of a planet gear speed-reducing starter in which the rotation of an armature rotary shaft is applied through a planet gear speed-reducing mechanism to an output rotary shaft coupled to the planet gear speed-reducing mechanism; which, according to the invention, comprises: a carrier in which support pins supporting the planetary gears of the planet gear speed-reducing mechanism are embedded, and which is fitted on the rear end portion of the output rotary shaft with the rearward movement thereof limited, and positioning means for preventing the rearward movement of the output rotary shaft, and positioning means for preventing the forward movement of the carrier which is fitted on the output rotary shaft, the carrier and the output rotary shaft being slidable with a predetermined torque.

In the starter of the invention, the carrier serving as the arm of the planet gear speed-reducing mechanism is fitted on the output rotary shaft while being positioned in the axial direction, so that the slide surfaces (fitted surfaces) of the carrier and the output rotary shaft are maintained unchanged in area, and accordingly the slide torque is maintained unchanged therein. Thus, in the starter of the invention, the impact absorbing action is stable as a whole.

The nature, principle and utility of the invention will become more apparent from the following detailed description when read in conjunction with the accompanying drawings.

DETAILED DESCRIPTION OF THE INVENTION

Preferred embodiments of this invention will be described with reference to the accompanying drawings.

Figure 1:
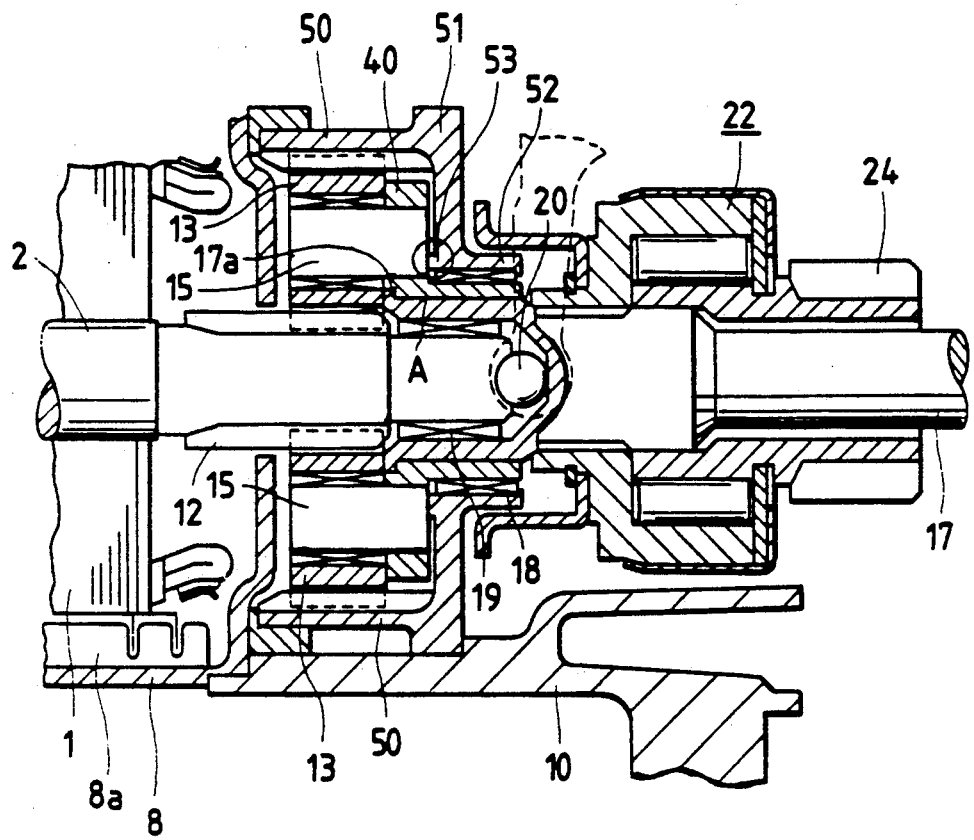
FIG. 1 is a sectional view showing an example of a planet gear speed-reducing starter which constitutes one embodiment of this invention.

An example of a planet gear speed-reducing starter is as shown in FIG. 1, which constitutes a first embodiment of the invention.

As shown in FIG. 1, the support pins 15 of planetary gears 13 are fixedly embedded in a carrier 40, which forms the arm of a planet gear speed-reducing unit. The front end portion of the carrier 40 is in the form of a cylinder which is mounted on the rear end portion of the output rotary shaft 17 of the starter in such a manner that it is retained in place with a flange 17a formed at the rear end of the output rotary shaft 17. It is preferable that the carrier 40 is shrinkage-fitted on the output rotary shaft 17, and the fitted surfaces are applied with a lubrication stabilizer. The planetary gears 13 are engaged with the internal gear of a ring gear 50. The front end portion of the ring gear 50 is formed into a flange 51 with a cylindrical protrusion 52. The cylindrical protrusion 52 is mounted through a sleeve bearing 18 on the carrier 40. The flange 51 of the ring gear 50 has a protrusion 53 on its rear surface to prevent the forward movement of the carrier 40, and to maintain unchanged the area of engagement of the carrier 40 and the output rotary shaft 17.

The output rotary shaft 17 is positioned by a rear bearing (not shown) with the aid of a ball 20 and the armature rotary shaft 2, so that the rearward movement of the output rotary shaft 17 is prevented. The output rotary shaft 17 is further positioned by the protrusion 53 of the flange 51 with the aid of the carried 40 mounted on the output rotary shaft 17, so that the forward movement of the output rotary shaft is prevented.

A sleeve bearing 19 is fitted in a recess formed in the rear end of the output rotary shaft 17, thus supporting the front end portion of the armature rotary shaft 2. The aforementioned ball 20 is interposed between the front end face of the armature rotary shaft 2 and the output rotary shaft 17, to transmit a thrust load therebetween, and to function as means for performing the rear positioning of the output rotary shaft 17.

Figure 6:
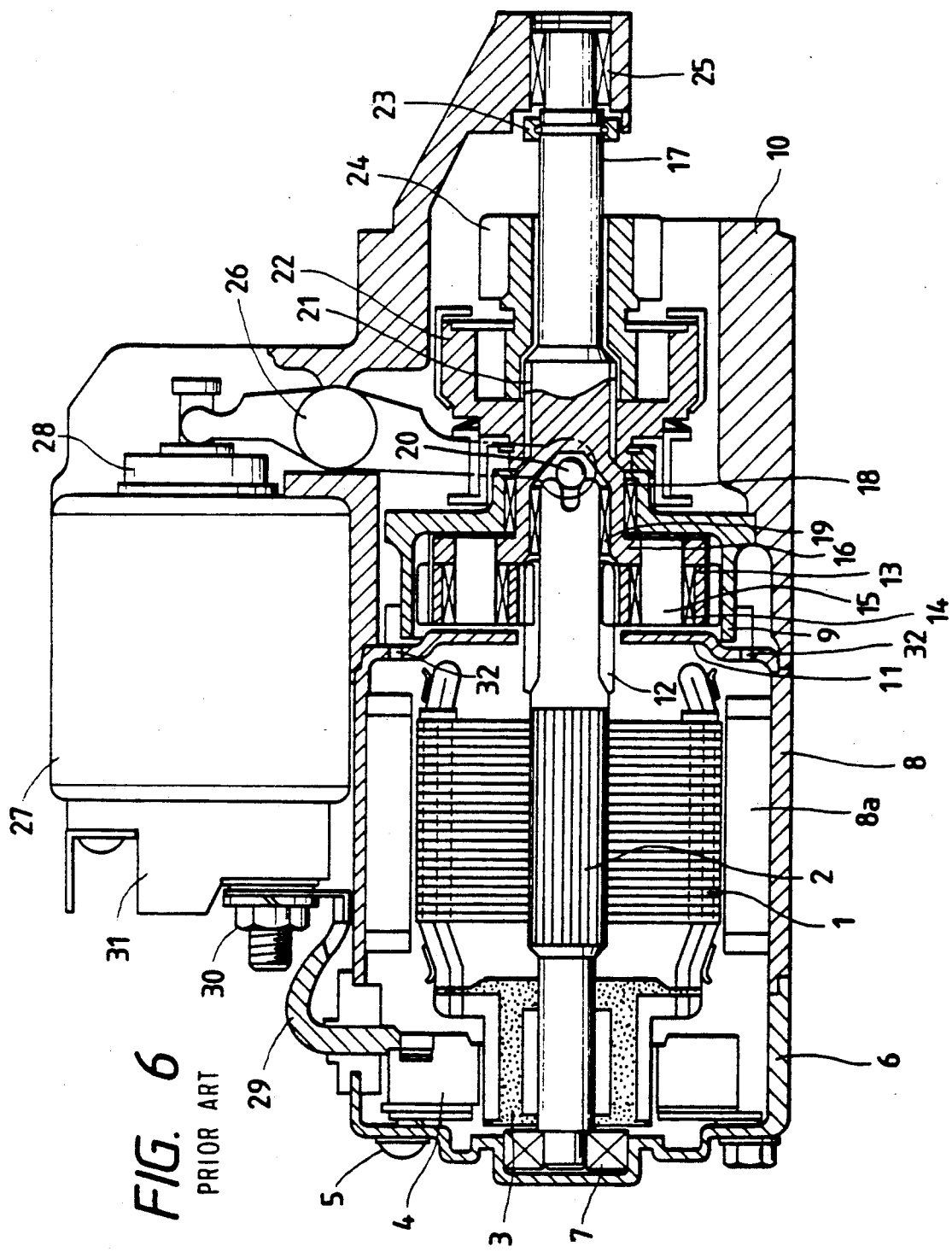
FIGS. 6 and 7 are sectional views showing examples of a conventional planet gear speed-reducing starter.
Figure 7:
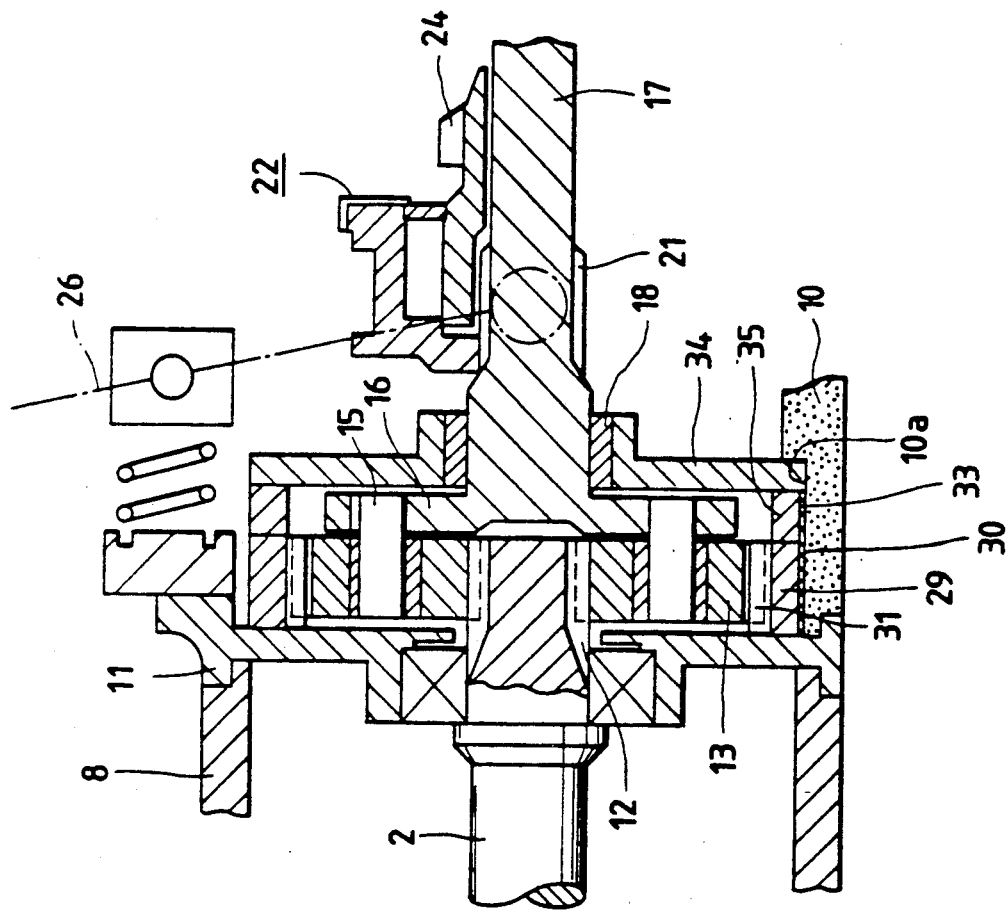

The other arrangements are the same as those in the conventional starter shown in FIG. 6.

In the above-described starter, the front positioning and the rear positioning of the output rotary shaft 17 are achieved in the above-described manner, and accordingly the carrier 40 mounted on it is positioned simultaneously. Hence, the slide surfaces (or the fitted surfaces) of the output rotary shaft 17 and the carrier 40 are maintained unchanged in area, and therefore in the slide surface area the slide torque is not reduced at all; that is, the impact absorbing action is achieved stably as a whole.

Figure 2:
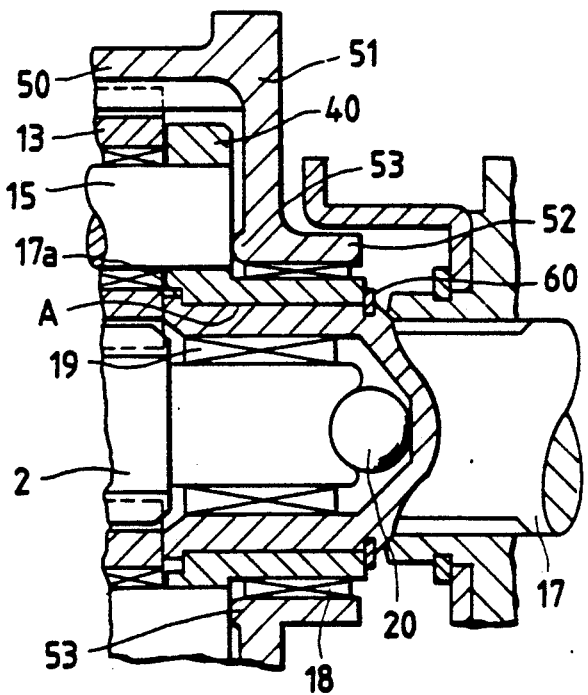
FIGS. 2 through 5 are sectional views showing modifications of the planet gear speed-reducing starter according to the invention.

In the above-described starter, the front positioning of the carrier 40 is achieved with the protrusion 53 formed on the flange 51. However, the same effect can be obtained by the provision of a locking member 60 between the carrier 40 and the output rotary shaft 17 as shown in FIG. 2. In the case where the locking member 60 is provided in this manner, the protrusion 53 may be eliminated from the flange 51. In this case, the front positioning of the output rotary shaft 17 is achieved with a bearing (not shown) provided at the front end of the output rotary shaft 17.

The above-described embodiment is not so different in construction from the conventional starter shown in FIG. 6, and therefore the components of the former is somewhat interchangeable with those of the latter.

Figure 3:
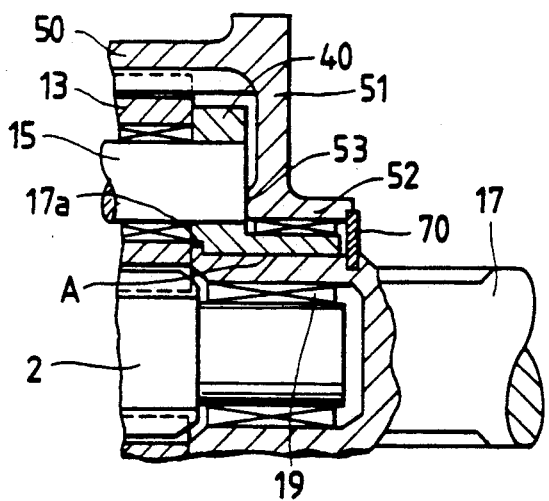

Furthermore, in the above-described embodiment, the rear positioning of the output rotary shaft 17 is achieved with the ball 20 disposed between the armature rotary shaft 2 and the output rotary shaft 17. However, the same effect can be obtained as follows:

As shown in FIG. 3, a locking member (such as a retaining ring) 70 is provided between the cylindrical protrusion 52 of the flange 51 and the output rotary shaft 17, to achieve the rear positioning of the output rotary shaft 17. In this case, the front positioning of the carrier 40 is achieved with a protrusion 53 formed on the flange 51, and the front positioning of the output rotary shaft 17 is achieved with the protrusion 53 of the flange 51 and with the above-described locking member 70. A flange 17a is formed on the output rotary shaft 17 at the rear end so as to prevent the difficulty that the carrier 40 comes off the latter 17.

Figure 4:
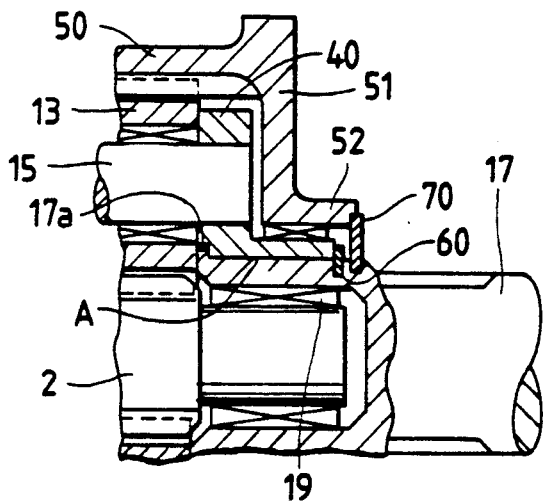

Furthermore, the following method may be employed. As shown in FIG. 4, a locking member (such as a retaining ring) 70 is provided between the cylindrical protrusion 52 of the flange 51 and the output rotary shaft 17, for the rear positioning of the output rotary shaft 17. And another locking member 60 is provided between the carrier 40 and the output rotary shaft 17, for the front positioning of the carrier 40. In this case, the front positioning of the output rotary shaft 17 is achieved with the locking member 70 and a bearing (not shown) at the front end.

Figure 5:
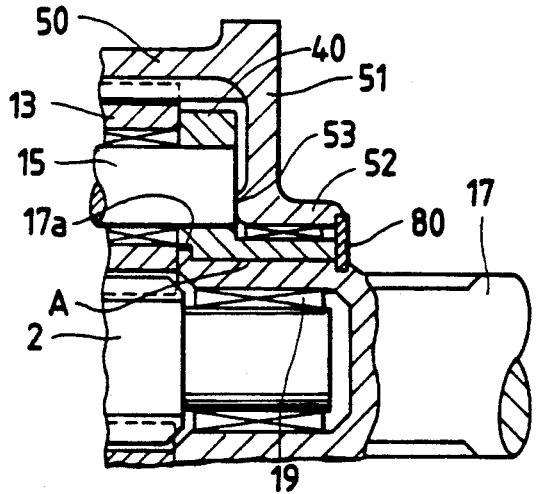

In addition, the following method may be employed: As shown in FIG. 5, a locking member (such a retaining ring) 80 is so provided as to position the cylindrical protrusion 52 of the flange 51, the carrier 40 and the output rotary shaft 17 with respect to one another, thereby to achieved the rear positioning of the output rotary shaft 17 and the front positioning of the carrier 40. In this case, a protrusion 53 may be formed on the flange 51 to assist in the rear positioning of the output rotary shaft 17 and in the front positioning of the carrier 40.

In the above-described embodiments, the fitted surfaces of the output rotary shaft and the carrier are maintained unchanged in area, for instance, with the aid of the locking member, so that the impact can be absorbed with the slide torque maintained stable. In addition, the positioning of the output rotary shaft is achieved with high accuracy, which eliminates the difficulties that the output rotary shaft plays, and it thrusts the armature rotary shaft, and that the relevant components are worn out or damaged.

As was described above, in the planet gear speed-reducing starter of the invention, the carrier, in which the support pins supporting the planetary gears are embedded, is mounted on the rear end portion of the output rotary shaft in such a manner that the carrier is not moved rearward, and the positioning means is provided to prevent the rearward movement of the output rotary shaft, and the member is provided to achieve the front positioning of the carrier mounted on the output rotary shaft. Thus, the starter of the invention can be obtained by modifying the conventional starter slightly, and yet the slide surfaces of the carrier and the output rotary shaft are maintained unchanged in area, and the slide torque is not lowered. That is, in the starter of the invention, the impact absorbing mechanism is stable.

At the same time, in the starter of the invention, the output rotary shaft is positioned with high accuracy. Difficulties are eliminated such that output rotary shaft play and thrust against the armature rotary shaft are minimized, and thus the relevant components are not worn out or damaged.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A planet gear speed-reducing starter in which the rotation of an armature rotary shaft (2) is applied through a planet gear speed-reducing mechanism (13) to an output rotary shaft (17) coupled to said planet gear speed-reducing mechanism (13), which comprises:

a carrier (40) fitted on the rear end portion of said output rotary shaft (17), said carrier (40) embedding support pins (15) supporting the planetary gears of said planet gear speed-reducing mechanism (13);

a first positioning means (20, 53, 70, 80) for preventing the movement of said output shaft in an axial direction thereof; and a second positioning means (17a, 53, 60, 80) for preventing the movement of said carrier in an axial direction thereof;

in which said carrier (40) and said output rotary shaft (17) being slidable with a predetermined torque.

2. A planet gear speed-reducing starter according to claim 1, in which said carrier (40) is shrinkage-fitted on said output rotary shaft (17).

3. A planet gear speed-reducing starter according to claim 2, in which the fitted surfaces between said carrier (40) and said output rotary shaft (17) are applied with a lubrication stabilizer.

4. A planet gear speed-reducing starter according to claim 1, further comprising a ring gear (50) of which said planet gear speed-reducing mechanism (13) are engaged with the internal gear, said ring gear (50) being formed with flange (51) having a cylindrical protrusion (52), in which said first positioning means comprises a protrusion (53) formed at the rear surface of said flange (51) so that said protrusion (53) prevents the forward movement of said output rotary shaft (17), and said second positioning means comprises a flange (17a) formed at the rear end of said output rotary shaft (17) so that said flange (17a) prevents the rearward movement of said carrier (40).

5. A planet gear speed-reducing starter according to claim 4, in which said second positioning means further comprises a locking member (60) provided between said carrier and said output rotary shaft (17) so that said locking member (60) prevents the forward movement of said carrier (40).

6. A planet gear speed-reducing starter according to claim 4, in which said first positioning means further comprises a locking member (70) provided between the cylindrical protrusion (52) of said flange (51) and said output rotary shaft (17) so that said locking member (70) prevents the rearward movement of said output shaft (17).

7. A planet gear speed-reducing starter according to claim 5, in which said first positioning means further comprises a locking member (70) provided between the cylindrical protrusion (52) of said flange (51) and said output rotary shaft (17) so that said locking member (70) prevents the rearward movement of said output shaft (17).

8. A planet gear speed-reducing starter according to claim 4, in which said first positioning means comprises a locking member (80) being so provided as to position said cylindrical protrusion (52) of said flange (51), said carrier (40) and said output rotary shaft (17) with respect to one another in such a manner that the rear positioning of said output rotary shaft (17) and the front positioning of said carrier (40) are achieved.

* * * * *